United States Patent [19]
Bahout

[11] Patent Number: 5,594,793
[45] Date of Patent: Jan. 14, 1997

[54] INTEGRATED CIRCUIT CONTAINING A PROTECTED MEMORY AND SECURED SYSTEM USING SAID INTEGRATED CIRCUIT

[75] Inventor: Yvon Bahout, Fuveau, France

[73] Assignee: SGS-Thomson Microelectronics, S.A., Gentilly Cedex, France

[21] Appl. No.: 329,975

[22] Filed: Oct. 27, 1994

[30] Foreign Application Priority Data

Oct. 28, 1993 [FR] France .................................. 93 13091

[51] Int. Cl.$^6$ ................................................ G06F 12/14
[52] U.S. Cl. .................. 380/4; 364/DIG. 1; 364/DIG. 2; 364/246.8; 364/969
[58] Field of Search ......................... 380/3, 4; 364/246.6, 364/246.8, 246.9, 964, 969.2, 969.3

[56] References Cited

U.S. PATENT DOCUMENTS

| | | |
|---|---|---|
| 4,211,919 | 7/1980 | Ugon . |
| 4,736,419 | 4/1988 | Roe ............................................ 380/3 |
| 4,870,401 | 9/1989 | Lee et al. . |
| 4,908,790 | 3/1990 | Little et al. . |
| 4,935,645 | 6/1990 | Lee . |
| 4,943,804 | 7/1990 | Lee et al. . |
| 4,978,869 | 12/1990 | Dias . |
| 5,010,331 | 4/1991 | Dias et al. . |
| 5,097,154 | 3/1992 | Adams . |
| 5,099,153 | 3/1992 | Adams . |
| 5,206,905 | 4/1993 | Lee et al. . |
| 5,226,137 | 7/1993 | Bolan et al. . |
| 5,237,699 | 8/1993 | Little et al. . |
| 5,327,564 | 7/1994 | Little . |
| 5,388,157 | 2/1995 | Austin ......................................... 380/4 |
| 5,452,355 | 9/1995 | Coli ............................................ 380/4 |
| 5,467,396 | 11/1995 | Schossow et al. ........................ 380/4 |

FOREIGN PATENT DOCUMENTS

| | | |
|---|---|---|
| 467355 | 1/1992 | European Pat. Off. . |
| 490511 | 6/1992 | European Pat. Off. . |

OTHER PUBLICATIONS

*IEEE Journal of Solid-State Circuits*, vol. 21, No. 5, Oct. 1986, pp. 881–888, by Letham et al., "A 128K EPROM Using Encryption of Pseudorandom Numbers Toenable Read Access".

*IBM Technical Disclosure Bulletin*, vol. 30, No. 12, May 1988, pp. 30–33, "Remote Security Anchoring of Remote User Identification".

*Primary Examiner*—Gilberto Barrón, Jr.
*Attorney, Agent, or Firm*—Robert Groover; Betty Formby; Matthew Anderson

[57] ABSTRACT

To provide efficient protection, in reading mode, of the stored data elements, the integrated circuit has an EEPROM type memory and a lock (L) protecting the zone of the memory. The memory contains a read-protected password (PW) and the circuit has means to release the lock (L) if the circuit receives a write command at the address of the password of the same encrypted password (PW). Application notably to electronic systems and instruments using confidential codes, such as car radios.

19 Claims, 3 Drawing Sheets

5,594,793

INTEGRATED CIRCUIT CONTAINING A PROTECTED MEMORY AND SECURED SYSTEM USING SAID INTEGRATED CIRCUIT

BACKGROUND OF THE INVENTION

1. Field of the Invention

The invention relates to an integrated circuit that can be used as an electrically modifiable non-volatile memory and enables the protection, in reading mode, of at least a part of the data elements that it contains. The invention also relates to a system using such an integrated circuit in order to make this system incapable of being used without the knowledge of a confidential code to inhibit the protection of the memory and hence that of the system.

The invention finds numerous applications in the field of so-called large-scale consumer applications. Examples of such applications include car radios with anti-theft codes, portable microcomputers, video tape-recorders, television sets and, more generally, all electronic devices that have to be protected against theft by a confidential code.

The integrated circuit according to the invention can also be used for the transmission of data elements that are secured by means of the protectable part of the memory.

2. Description of the Prior Art

Up till now, the protection, by anti-theft codes, of electronic devices such as car radios has been done by means of a confidential code specific to the device written in a programmable memory at a determined address. The memory, which is generally of the EEPROM type, is associated with means for locking at least one part of the data elements that it contains, the locking being activated automatically when the memory is no longer supplied with power. The memory could then be unlocked if it receives a command for the writing, at the determined address, of a data element that coincides with the confidential code.

The drawback of this approach lies in the fact that it is possible to detect the address of the confidential code and write a confidential code of one's choice therein. Thus a stolen device can be reused by means of this new code.

One solution to this problem consists in using a microprocessor-based card that ensures a high degree of inviolability. This solution, however, is costly (in terms of the cost of the card and of its reader). This practically rules out its use for inexpensive, large-scale consumer products. Furthermore, the customizing of each device produced, namely the assigning of a specific code word, must necessarily be done by the manufacturer of the microprocessor of the card in view of the confidentiality attached to the procedures for programming these cards.

SUMMARY OF THE INVENTION

The invention is aimed at overcoming the above-mentioned drawbacks by proposing a standard integrated circuit that can be customized individually by the manufacturer of electronic devices and by giving the system a reasonable degree of inviolability.

To this end, an object of the invention is an integrated circuit comprising an electrically modifiable non-volatile memory, an associated control circuit and at least one volatile memory element constituting a lock whose state, when it is powered on, defines a locked state of said memory, said integrated circuit being one wherein said memory has a first zone that can be read-protected by said lock and a second zone that is always read-protected, write-protected by said lock and contains at least one password at a determined address, wherein said control circuit has first means to detect a command for writing a data element addressed by said determined address while said memory is locked and second means to verify the compatibility of said data element with said password, said compatibility being different from identity, and wherein, in the event of compatibility, said lock is released.

According to a particular embodiment, the integrated circuit has decrypting means and said verification of compatibility then consists in decrypting said received data element addressed by said determined address and in comparing said decrypted data element with said password contained in said determined address.

To enable the manufacturer or the user to modify the password, without thereby enabling this password to be detected by a simple analysis of the signals external to the circuit, it will advantageously be provided that when a command for writing a data element addressed by said determined address is detected while the lock is released, the control circuit activates the decryption of said data element and the writing of said decrypted data element at said determined address.

According to yet another alternative embodiment, the second zone contains several passwords and one of these passwords, called a manufacturer's password, can be write-protected independently of the state of the lock. It will then be possible for the manufacturer to dictate a password that cannot be modified by a third party while, at the same time, enabling the user to choose, at will, his own confidential code which will correspond to a modifiable "user" password.

It is furthermore desirable to enable the manufacturer to use a single procedure for each manufactured device and to avoid a situation where the customizing of an instrument necessitates a specific programming of the other components of the apparatus. To this end, and according to another aspect of the invention, the circuit contains a decryption key and the memory comprises a third zone that is freely accessible in reading mode and contains a system identification data element, said decryption key and said password each being a function of said identification data element.

Should it be planned that there will be a password reserved for the manufacturer, the above-mentioned arrangement will enable the manufacturer to retrieve the encrypted password from the identification data element alone. The memory could also be unlocked if, for example, the user no longer retrieves his confidential code.

According to a particular embodiment, the key is a word having the same size as the password, and the encryption or decryption then consists in carrying out Exclusive-OR operations on the bits having the same position in the key or word to be encrypted or decrypted.

According to another aspect, the key is contained in the second zone and the control circuit comprises third means to detect a command for writing a data element addressed by the address of said key while said lock is released, the control circuit activating said decryption of said data element and the writing of said decrypted data element at said key address.

Advantageously, the key will be capable of being write-protected in the same way as the manufacturer's password.

Finally, in order to enable an additional check on the integrity of the memory, it is also possible to see to it that any command for writing a data element addressed by the address (ADx) of the manufacturer's write-protected password leads to a check on the compatibility between said data element and said manufacturer's password and, in the event of incompatibility, to the locking of the memory.

An object of the invention is also a system comprising a processing unit connected to a user interface and to an integrated circuit as defined here above, said unit being capable of addressing said integrated circuit in read and write modes. The system is one wherein at least a part of the data elements needed for the operation of said system is contained in said first zone and wherein the processing unit is programmed to take account of a confidential code by means of the user interface and to activate the writing by said integrated circuit of said confidential code at said determined address.

Should the second zone contain an encryption and decryption key and a password of the manufacturer that is write-protected and is a function of the identification data element, the processing unit advantageously has means to compute the encrypted password as a function of the identification data element read in the third zone. This possibility may be exploited in order to check the coherence between the key and the manufacturer's password contained in the memory.

BRIEF DESCRIPTION OF THE DRAWINGS

Other aspects and advantages of the invention shall appear from the following description, made with reference to the appended drawings, of which.

MORE DETAILED DESCRIPTION

Figure 1:
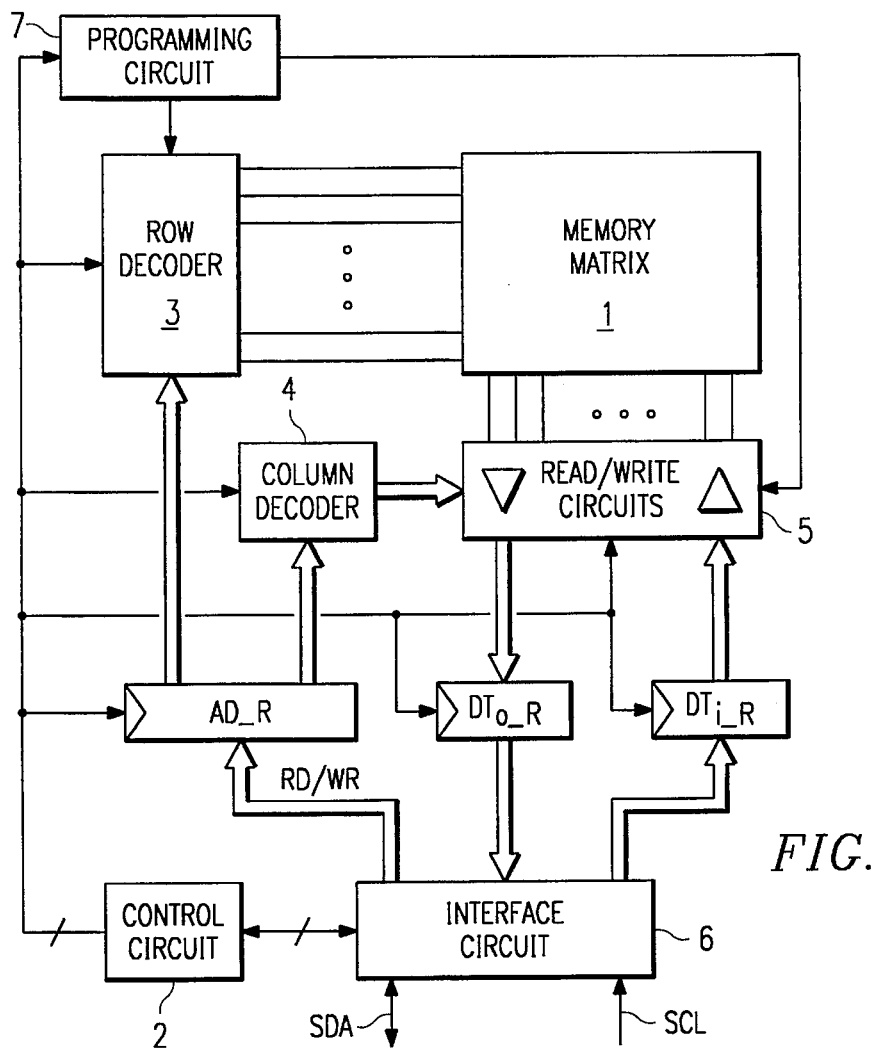
FIG. 1 shows the structure of an EEPROM according to the prior art.

FIG. 1 shows an exemplary structure of a standard type of EEPROM capable of being adapted to implement the invention.

The memory has a matrix 1 of memory cells connected to a row decoder 3 and to a column decoder 4 associated with read and write circuits 5. The matrix 1 is written in by means of a programming circuit 7 that is essentially constituted by an oscillator, an voltage-raising circuit and a programmed ramp generator. The decoders 3 and 4 are connected to an address register AD-R. The read and write circuits 5 are connected respectively to an output data register DTo-R and to an input data register DTi-R. The registers AD-R, DTo-R, DTi-R communicate with an interface circuit 6. According to the example shown, the circuit 6 is connected to a bus according to the standard I2C comprising notably a clock line SCL and a two-way line SDA enabling the addresses, data elements and commands to be conveyed. The entire unit is controlled by a control circuit 2. The circuit 2 will be formed, for example, by means of a programmable logic array (PLA) designed to give the control signals to the different circuits as a function of the commands received from the line SDA, such as the read command RD or write command WR.

Since the memory shown in FIG. 1 is of a standard type, a detailed description of its working would be superfluous. It should be recalled however that the interface circuit 6 has the function, in reception mode, of decoding the commands received from the line SDA and of transmitting them to the control circuit 2. The interface 6 also carries out the series-parallel conversion of the addresses and data elements received before transmitting them respectively to the address register AD-R and to the input data register DTi-R. In transmission, under the control of the control circuit 2, the interface 6 carries out the parallel-series conversion of the read data elements contained in the output data register DTo-R. Of course, these transfers of data elements are synchronized by the clock signal SCL and comply with the communications protocol of the bus.

For further details, it will be appropriate to refer to the specifications of the EEPROMs available in the market such as, for example, the model ST24C04 marketed by the firm SGS-THOMSON MICROELECTRONICS.

Figure 2:
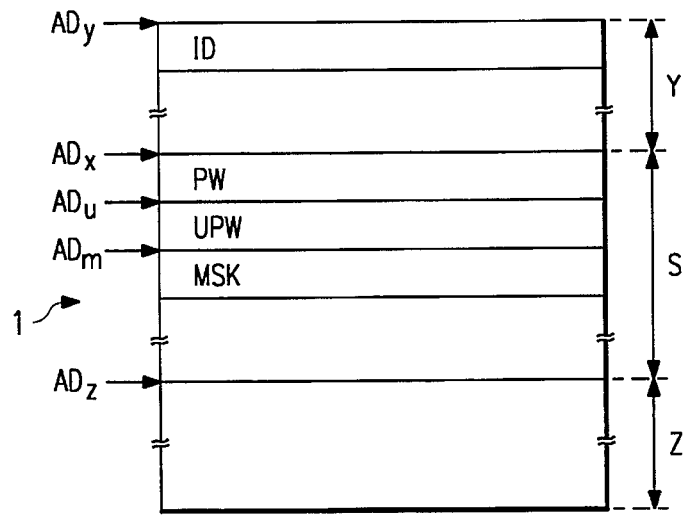
FIG. 2 shows the organization of the data elements contained in the memory according to the invention.

FIG. 2 shows the organization of the data elements contained in the memory with a view to implementing the invention. A first zone Z is designed to contain the data elements to be protected by a confidential code. These data elements will be, for example, the data elements needed for the operation of a microprocessor-based system or an instrument provided with a microcontroller. This zone is localized by the most significant bits of the address ADz of the first word that it contains.

A second zone S contains one or more passwords PW, UPW as well as a key MSK localized respectively by the addresses ADx, ADu and ADm. It must be noted that this zone is not necessarily formed by contiguous words. According to the invention, the words contained in the zone S are permanently read-protected. They may be modified (in writing) under certain conditions as shall be seen here below.

A third zone Y that is freely accessible in reading mode contains an identification data element ID (for example a serial number) of the instrument that contains the memory. This zone should be capable of being written in by the manufacturer of the instrument, but it should not be capable of being modified by its user.

According to the invention, the control circuit 2 is designed so as to control the conditions of access to the three zones in accordance with the rules explained here above. In particular, read access to the first zone Z shall be conditional upon prior presentation of a password encrypted by means of the key MSK. More detailed explanations shall now be given with reference to FIGS. 3 and 4.

Figure 3:
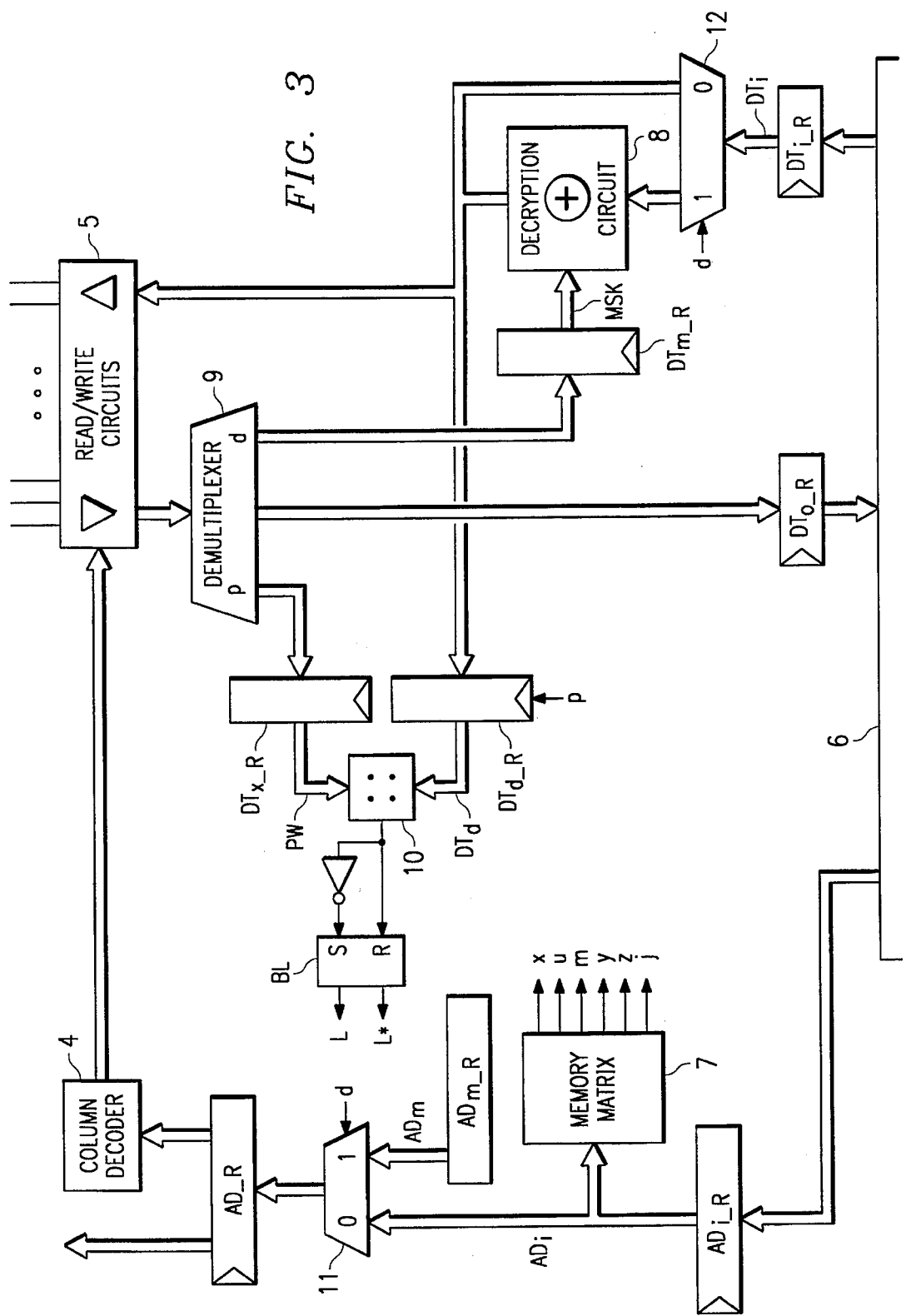
FIG. 3 shows the modifications to be made to the memory according to FIG. 1 for the implementation of the invention.

FIG. 3 shows the modifications to be made to the data path of the memory shown in FIG. 1 for the implementation of the invention. This figure again shows the interface circuit 6, the column decoder 4, the read and write circuits 5 and the address register AD-R. The register AD-R is connected to the interface 6 by means of a second address register ADi-R and a multiplexer 11. The output of the second address register ADi-R is connected to the input of an address decoding circuit 7 that gives, at output, the signals x, u, m, y, z, j representing the detection of particular addresses or memory zones. The first input of the multiplexer 11 is connected to the output of the second address register ADi-R and its second input receives a fixed address value ADm corresponding to the address of the key MSK.

The output of the input data register DTi-R is connected to the input of a demultiplexer 12 having one of its outputs connected to the input of a decryption circuit 8. The second output of the demultiplexer 12 and the output of the circuit 8 are connected to the inputs of the circuits 5 and of a register of decrypted data elements DTd-R.

The outputs of the circuits 5 are connected to the input of a second demultiplexer 9 with three outputs. The first output is connected to the input of a secret data register DTx-R, the second output is connected to the input of the output data register DTo-R and the third output is connected to the input of a key register DTm-R. The output of the key register DTm-R is connected to the input of the decryption circuit 8.

The outputs of the decrypted data register DTd-R and secret data register DTx-R are connected to a comparator 10 whose output is connected, firstly, to the input R for resetting a flip-flop circuit BL at zero and, secondly, to its positioning (setting at "1") input S by means of an inverter. The state L (with its complement L*) of the flip-flop circuit BL defines the protected state of the memory. More specifically, this means that the zone Z is prohibited in reading mode when L=1. The positioning input S of the flip-flop circuit BL is connected to means (not shown) to set L at 1 when the circuit is turned on.

Figure 4:
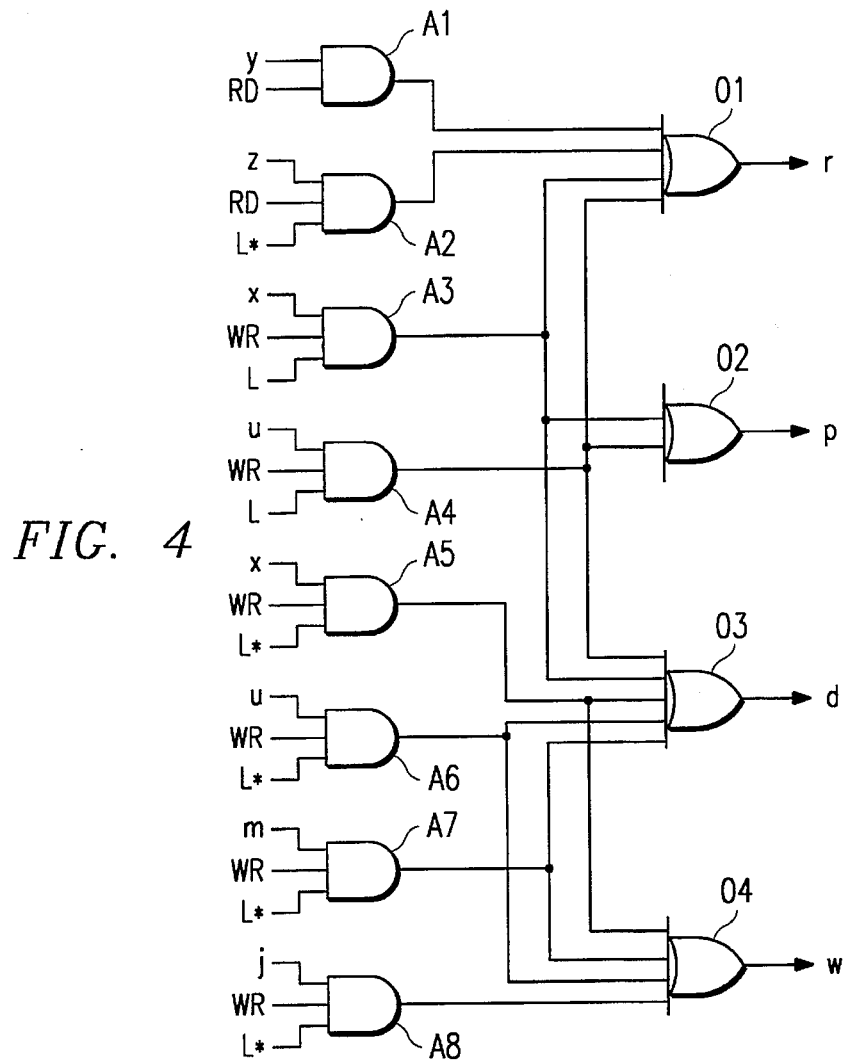
FIG. 4 shows a part of the control circuit of an exemplary embodiment of the integrated circuit according to the invention.

Before explaining the working of the circuit of FIG. 3, reference must be made to FIG. 4 to define the main signals needed to control the circuit. According to the example shown, the address decoding circuit 7 gives the logic signals x, u, m, y, z, j in the event of coincidence between the received address contained in the second address register ADi-R and, respectively, the addresses ADx, ADu, ADm, ADy, ADz defined here above with reference to FIG. 2. An additional signal j can be used to define a particular zone of the memory where a write operation is permitted according to the normal procedure, it being furthermore possible for this zone to coincide with a part of the zone Z or this zone Z in its entirety.

The logic circuit shown in FIG. 4 has the general structure of a programmable logic array that is consequently capable of being easily integrated into the array constituting the control circuit of the standard memory. It is thus constituted by a set of AND gates A1 to A8 whose outputs are connected to a set of OR gates 01 to 04. The inputs of the AND gates receive the various signals defined here above as well as read control signals RD or write control signals WR decoded by the interface 6.

The first OR gate 01 gives an internal read control signal r in the following four cases:

—external read command RD in the freely accessible zone Y;

—external read command RD in the protected zone Z while the lock L is released (L*=1);

—presentation of an encrypted password detected by a write command WR at one of the addresses ADx or ADu while the memory is locked (L=1).

The different cases of the presenting a password are detected by the second OR gate 02 which gives a signal p indicating whether the conditions for presenting a password are met. In this case, the external write command WR must be interpreted as an internal reading of a password. The third OR gate 03 gives a decryption detection signal d. The signal d is activated when one of the following conditions is met:

—an external write command WR is interpreted as a presenting of a password;

—an external write command WR for writing one of the passwords is detected while the lock is released (L=0);

—an external write command WR for writing the key is detected while the lock L is released.

The fourth OR gate 04 gives an internal write control signal w when an external command WR for writing one of the passwords, the key or a data element contained in a write-authorized zone is detected while the lock is released.

The circuit of FIG. 3 works as follows. When an external command for reading a data element contained in the freely accessible zone Y or in the protected zone Z is detected while the lock L is released, the demultiplexer 9 permits the transfer of the data element read towards the output data register DTo-R. In every case where the decryption detection signal d is active, the circuit carries out a prior reading of the key MSK by addressing the memory by the address ADm by means of the multiplexer 11. The data read is then transferred by the demultiplexer 9 to the key register DTm-R so as to enable the operation of decryption by the circuit 8. Then, if it is a presentation (p=1), the demultiplexer 9 permits the transfer of the password read into the secret data register DTx-R. At the same time, the received data element contained in the input data register DTi-R is transferred to the input of the decryption circuit 8 by the demultiplexer 12. Furthermore, the input data decrypted by the circuit 8 is transferred to the decrypted data register DTd-R and its contents are compared with those of the register DTx-R. In the event of identity, the flip-flop circuit BL is reset at zero. This releases the lock L. If there is a difference, the flip-flop circuit BL is set at 1, and this locks L.

When an external write command WR for writing a password or writing the key is detected while the lock is released, this write command is first of all interpreted as a decryption command (d=1) and, with a presenting of a password, leads to a preliminary cycle for reading the key MSK and for loading it in the key register DTm-R by means of the demultiplexer 9. When this operation is ended, the data element received is decrypted by the circuit 8 and then written in the memory as a new password or new key, provided that the data element to be written is not located in a zone that is write-protected independently of the state of the lock L.

A simple way to carry out the decryption consists in choosing, as the key MSK, a word having the same length as the passwords and in carrying out "Exclusive OR" operations on the bits having the same position in the key and the word to be decrypted. In this case, the decryption operation is identical to the encryption operation.

Figure 5:
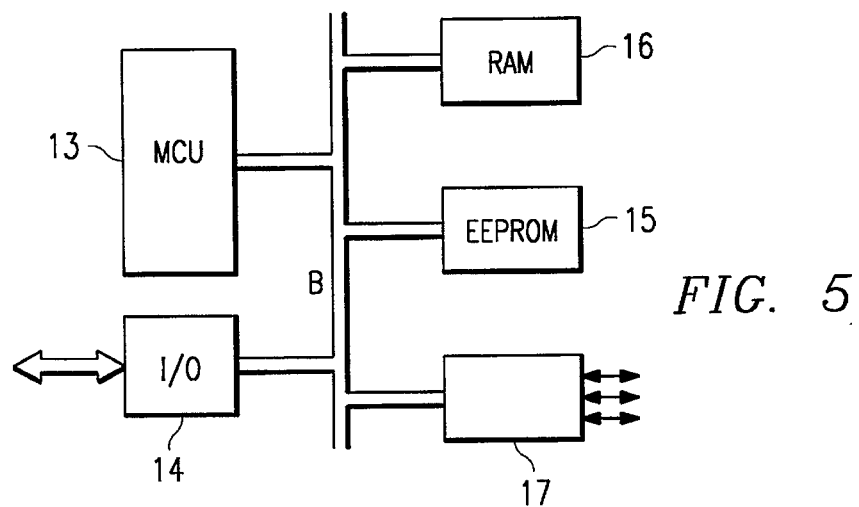
FIG. 5 shows a schematic view of a system using the integrated circuit according to the invention.

FIG. 5 shows a schematic view of a system secured by means of an integrated circuit according to the invention. The system is organized around a bus B and comprises a programmable processing unit 13, such as a microprocessor or a microcontroller, a circuit 15 containing a memory protected according to the invention, a user interface 14 and other components such as a random-access memory 14 and a set of interface circuits 17.

The interface 14 enables the user to present a confidential code after the system is turned on. This confidential code is normally identical to the encrypted value of a "user" password UPW contained in the memory. The processing unit then sends the circuit 15 a write command at the address ADu of the confidential code. As explained here above, the circuit 15 interprets this command as a presentation and makes a comparison between the decrypted received word and the password UPW read at the address ADu. If equality is detected, the lock L is released.

The system will advantageously be designed to enable the user to modify his confidential code by means of an appropriate command applied to the interface 14. The writing in the circuit 15 of a corresponding new password will be done as indicated here above. This operation will be accompanied by the setting of the flip-flop circuit BL at 1, but this flip-flop circuit BL will be reset at zero following a new presentation of the new confidential code.

It can be noted that the cases of presenting or modifying the password do not provide for the detection, by simple analysis, of the signals conveyed on the bus, the key and the password contained in the memory.

According to one variant, the manufacturer's key and password are placed in a write-protected zone and can be computed as a function of an identification data element ID by means of a confidential algorithm. If, furthermore, the processing unit contains an algorithm or a table enabling it to compute the encrypted password as a function of the identification data element, the unit will be in a position to verify the compatibility between the manufacturer's password and the key contained in the memory by presenting the manufacturer's encrypted password resulting from the computation.

This verification can be prompted automatically by the microcontroller by making provision, in its execution program, for periodic or random commands for writing the manufacturer's encrypted password. Thus, should the password received by the memory be different from the one that it contains, it gets locked automatically.

The means that can be used by the manufacturer to lock a determined zone of the memory in writing mode are of a standard type. A protection such as this is designed, for example, in the memory reference ST24C04 by SGS-THOMSON MICROELECTRONICS.

The embodiment that has just been described should not be considered as restricting the scope of the invention since many variants thereof can be made by those skilled in the art through the replacement of certain described elements by equivalent means or through the adapting of the implementation to other types of memories.

What is claimed is:

1. An integrated circuit comprising an electrically modifiable non-volatile memory, an associated control circuit and at least one volatile memory element constituting a lock whose state, when it is powered on, defines a locked state of said memory, said integrated circuit being one wherein said memory has a first zone that can be read-protected by said lock and a second zone that is always read-protected, write-protected by said lock and contains at least one password at a determined address, wherein said control circuit has first means to detect a command for writing a data element addressed by said determined address while said memory is locked and second means to verify the compatibility of said data element with said password, said compatibility being different from identity, and wherein, in the event of compatibility, said lock is released.

2. An integrated circuit according to claim 1 including decrypting means, wherein said verification of compatibility then consists in decrypting said received data element addressed by said determined address and in comparing said decrypted data element with said password contained in said determined address.

3. An integrated circuit according to claim 2 wherein, when a command for writing a data element addressed by said determined address is detected while the lock is released, the control circuit activates the decryption of said data element and the writing of said decrypted data element at said determined address.

4. An integrated circuit according to claim 1, wherein said second zone contains several passwords and wherein one of said passwords, hereinafter called a manufacturer's password, can be write-protected independently of the state of the lock.

5. An integrated circuit according to claim 4, containing a decryption key, the memory including a third zone that is freely accessible in reading mode and that contains a system identification data element, wherein said decryption key and said password are each a function of said identification data element.

6. An integrated circuit according to claim 5, wherein said key is a word having the same length as said passwords and wherein said encryption or decryption then consists in carrying out Exclusive-OR operations on the bits having the same position respectively in the key or word to be encrypted or decrypted.

7. An integrated circuit according to claim 5, wherein said key is contained in said second zone, wherein said control circuit comprises third means to detect a command for writing a data element addressed by the address of said key while said lock is released and wherein the control circuit activates said decryption of said data element and the writing of said decrypted data element at said key address.

8. An integrated circuit according to claim 5, wherein said key can be write-protected independently of the state of the lock.

9. An integrated circuit according to claim 5, wherein any command for writing a data element addressed by the address of the manufacturer's write-protected password leads to a check on the compatibility between said data element and said manufacturer's password and, in the event of incompatibility, to the locking of the memory.

10. A system comprising a processing unit connected to a user interface and to an integrated circuit according to claim 2, said unit being capable of addressing said integrated circuit in read and write modes, wherein at least a part of the data elements needed for the operation of said system is contained in said first zone and wherein the processing unit is programmed to take account of a confidential code by means of the user interface and to command the writing by said integrated circuit of said confidential code at said determined address.

11. A system including a processing unit and an integrated circuit according to claim 9, said unit being capable of addressing said integrated circuit in reading and writing modes, wherein at least a part of the data elements needed for the operation of said system is contained in said first zone, wherein the manufacturer's password is write-protected and wherein the processing unit comprises means to compute the encrypted password as a function of said identification data element read in said third zone and wherein the processing unit is programmed to command the writing, by said integrated circuit, of the manufacturer's encrypted password at said address of the manufacturer's password.

12. A data protection system, comprising:
    a memory locking circuit, said circuit capable of indicating at least two distinct locking states;
    a first memory portion which can only be read when said locking circuit is in a first state;
    a second memory portion which can only be read from or written to when said locking circuit is in said first state;
    memory access circuitry for reading and writing said first and second memory portions according to the state of said memory locking circuit;
    wherein said memory locking circuit is in a second state when powered on.

13. The system circuit of claim 12, wherein a password data is stored at a determined address in said second memory portion.

14. The system circuit of claim 13, wherein when said access circuitry receives command to write a data element to said address in second memory portion, and said locking circuit is in said second state, then if said data element is consistent with said password data, said locking circuit is placed in said first state.

15. The system circuit of claim 13, wherein when said access circuitry receives command to write a data element to said address in second memory portion, and said locking circuit is in said first state, then said data element is decrypted and stored at said address in said memory portion.

16. A data protection system, comprising:
- a memory locking circuit, said circuit capable of indicating at least two distinct locking states;
- a first memory portion which can only be read when said locking circuit is in a first state;
- a second memory portion which can only be read from or written to when said locking circuit is in said first state, said second memory portion storing a plurality of passwords at corresponding addresses;
- a third memory portion which is a ROM containing identification data;
- memory access circuitry for reading and writing said first and second memory portions according to the state of said memory locking circuit;
- coding circuitry connected to said access circuitry and each said memory portion for encrypting and decrypting data;
- wherein said memory locking circuit is in a second state when powered on.

17. The system circuit of claim 16, wherein when said access circuitry receives command to write a data element to any one of said addresses in said second memory portion, and said locking circuit is in said second state, then if said data element is consistent with the password corresponding to said address, said locking circuit is placed in said first state.

18. The system circuit of claim 16, wherein when said access circuitry receives command to write a data element to any one of said addresses in said second memory portion, and said locking circuit is in said first state, then said data element is decrypted and stored at said address in said memory portion.

19. The system circuit of claim 14, 17, 18, wherein said data element is decrypted before its consistency with said password data is determined.

* * * * *